United States Patent [19]
Yanagisawa et al.

[11] Patent Number: 5,706,430
[45] Date of Patent: Jan. 6, 1998

[54] METHOD AND SYSTEM FOR SEQUENTIALLY BROADCASTING DATA ACCORDING TO PRE-ASSIGNED TIME SLOTS WITH AND WITHOUT THE RECEPTION OF A SYNCHRONIZATION PACKET

[75] Inventors: Emiko Yanagisawa, Kawasaki; Minoru Koizumi, Yokohama; Tetsuhiko Hirata, Yokohama; Kenji Kataoka, Yokohama; Osamu Takada, Sagamihara; Hirashi Wataya, Katsuta, all of Japan

[73] Assignee: Hitachi, Ltd., Tokyo, Japan

[21] Appl. No.: 355,682

[22] Filed: Dec. 14, 1994

[30] Foreign Application Priority Data

Dec. 22, 1993 [JP] Japan .................. 5-323697

[51] Int. Cl.$^6$ .................. G06F 13/00
[52] U.S. Cl. .................. 395/200.01; 395/551; 395/559
[58] Field of Search .................. 375/1; 370/85, 370/95.3, 85.5; 364/200, 514; 325/55; 455/39; 379/57; 395/200, 200.01, 551, 559

[56] References Cited

U.S. PATENT DOCUMENTS

| | | | |
|---|---|---|---|
| 4,066,964 | 1/1978 | Costanza et al. | 325/55 |
| 4,439,856 | 3/1984 | Ulug | 370/85 |
| 4,516,239 | 5/1985 | Maxemchuk | 370/85 |
| 4,663,706 | 5/1987 | Allen et al. | 364/200 |
| 4,677,612 | 6/1987 | Olson et al. | 370/85 |
| 4,773,005 | 9/1988 | Sullivan | 364/200 |
| 4,994,960 | 2/1991 | Tuchler et al. | 364/200 |
| 5,068,916 | 11/1991 | Harrison et al. | 455/39 |
| 5,253,252 | 10/1993 | Tobol | 370/85.5 |
| 5,289,497 | 2/1994 | Jacobson et al. | 375/1 |
| 5,297,257 | 3/1994 | Struger et al. | 395/200 |
| 5,365,569 | 11/1994 | Witsaman et al. | 379/57 |
| 5,369,682 | 11/1994 | Witsaman et al. | 379/57 |
| 5,416,780 | 5/1995 | Patel | 370/95.3 |
| 5,490,087 | 2/1996 | Redden et al. | 364/514 |

FOREIGN PATENT DOCUMENTS

| | | |
|---|---|---|
| 58-96363 | 6/1983 | Japan . |
| 60-31668 | 2/1985 | Japan . |
| 63-199540 | 8/1988 | Japan . |
| 1-229542 | 9/1989 | Japan . |

*Primary Examiner*—Thomas C. Lee
*Assistant Examiner*—Duo Chen
*Attorney, Agent, or Firm*—Fay, Sharpe, Beall, Fagan, Minnich & McKee

[57] ABSTRACT

A distributed memory computer system periodically performs memory copy among a plurality of computers by using general-purpose communication control devices and a transmission line of the CSMA/CD type. A master computer periodically generates a synchronizing packet, and transmits data for memory copy and normal data in a time slot immediately after the transmission of the synchronizing packet. Each computer other than the master computer transmits the data for memory copy and the normal data in its own time slot after the elapse of a predetermined time. The respective computers complete their transmissions within predetermined times. Since the time slots are assigned to the respective computers, the number of computers which may compete with each other on a transmission line can be restricted and each computer can be assured a periodic opportunity to transmit data.

2 Claims, 11 Drawing Sheets

|   | 331 | 332 | 333 |
|---|---|---|---|
| 33 | COMPUTER NUMBER | WAITING TIME Ti | ENABLE TIME ti |
|   | 1 | T 1 | t1 |
|   | 2 | T 2 | t2 |
|   | 3 | T 3 | t3 |
|   | 4 | T 4 | t4 |
|   | COPY TIME MANAGEMENT TABLE | | |

FIG. 8

| DA | SA | PKT | DL | DATA |
|---|---|---|---|---|
| 101 | 102 | 103 | 104 | 105 |

METHOD AND SYSTEM FOR SEQUENTIALLY BROADCASTING DATA ACCORDING TO PRE-ASSIGNED TIME SLOTS WITH AND WITHOUT THE RECEPTION OF A SYNCHRONIZATION PACKET

BACKGROUND OF THE INVENTION

The present invention relates to a distributed memory computer system having a memory copy data transmission control for providing all the computers in the system with the same memory contents.

Conventional memory copy methods for a distributed memory computer system are described in, for example, Japanese Patent Laid-Open No. 96363/1983 (token bus), Japanese Patent Laid-Open No. 31668/1985 (token bus) and Japanese Patent Laid-Open No. 229542/1989 (no details of bus access). The system of 31668/1985 is partly disclosed in "Hardware Manual, Outline of HIDIC V90 μΣ NETWORK-10", and can be described as follows.

A plurality of computers, each having a main processor and a main memory, are connected to a transmission line via respective communication control devices, each communication control device having a control processor and a control memory. Each of the communication control devices periodically copies information in the main memory of the corresponding computer to a memory copy area of its own control memory, and the processor of the communication control device periodically broadcasts the contents of this area of the control memory to the other computers. On each receiving side of a computer, the broadcast information received through the transmission line is stored into the control memory of the communication control devices, and the information is then written into the main memory of the corresponding computer. The transmission line is a band-controllable, token bus. On the token bus, the data transmitted from computers do not collide with each other, so that memory copy can be effected without any disturbances of each transmission period. In the above-described manner, the contents of the main memories of computers coincide with one another through a periodic memory copy by the communication control devices, by using the band-controllable transmission line.

As a method of providing transmission control by establishing synchronism among individual computers, one example using a frame header is described in Japanese Patent Laid-Open No. 199540/1988. This method is an implicit token passing method in which each node has a frame counter incremented at each reception of a frame, and at a unique frame count, the node acquires the right to transmission. The opportunity of transmission is given to each node twice (first time for memory copy, second time for normal data) during one transmission period, as measured between the reception of one frame header and the reception of the succeeding frame header. Each node needs to transmit dummy data if there is no data to be transmitted when the right to transmission is acquired, so as to advance the frame counter of the other nodes. The frame headers are transmitted by a master node to reset the frame counter.

With the evolution of open networks, it is more desired to employ general-purpose Ethernet transmission lines and standard communication control devices. Since Ethernet adopts CSMA/CD (Carrier-Sense Multiple-Access with Collision-Detection) as an access method, which determines through carrier sensing that a transmission line is idle, if multiple computers start transmitted data at the same time, a collision of data may occur on the transmission line.

SUMMARY OF THE INVENTION

It is an object of the present invention to analyze the prior art, identify and analyze problems, and improve upon the prior art.

Retransmission of data after the detection of a prior art collision in an Ethernet memory copy distributed memory computer system may impair the periodicity of memory copy.

To realize memory copy by utilizing the control processor and the control memory of the communication control device as in the prior art, it is necessary to provide a memory copy control function in the communication control device. However, if a standard communication control device is applied in the prior art, it is necessary for the main processor and the main memory of a host computer to provide the memory copy function, because the control processor and the control memory of the standard communication control device do not have the memory copy function. The host computer needs to perform various processes, such as a receiving process, other than memory copy, and if the host computer is executing another process at the time of activation of the memory copy function, the host computer may disturb the periodicity of memory copy.

In the present invention, a distributed memory computer system comprises a plurality of computers and a plurality of communication control devices which connect the computers to a transmission line of a CSMA/CD type. Each of the computers identifies its own transmission time slot of pre-assigned predetermined period. The computers deliver data to their corresponding communication control devices in their own time slot, and the corresponding communication control device checks the state of the transmission line and, if the transmission line is busy, waits until the transmission line becomes ready for the transmission of data.

The time slots are identified in the following manner. For example, one of the plurality of computers serves as a master computer that periodically (variable or preferably fixed periods) transmits synchronizing packets to the transmission path, and the computers other than the master computer identify their own time slots by counting down respective pre-assigned unique waiting times after the arrival of the synchronizing packet. Each of the computers transmits data to its own communication control device and completes the data transmission within a predetermined transmission enable time (its own time slot).

Since each of the computers transmits data, inclusive of data for memory copy, to the other computers in its own preassigned time slot, collision of data on a transmission line is prevented, thereby assuring the periodicity of memory copy.

The communication control devices of the computers are preferably connected to one another via a transmission line of the CSMA/CD type, and each of the connection control devices detects the status of the transmission line by the carrier sense function of CSMA/CD. Accordingly, if the preceding computer communication control device continues a data transmission beyond its own time slot, the collision of data is avoided by controlling the start of a data transmission from the communication control device of the succeeding computer. The succeeding computer will transmit as soon as the line is idle since there is no competing computer, thereby holding the periodicity of memory copy.

BRIEF DESCRIPTION OF THE DRAWINGS

Further objects, features and advantages of the present invention will become more clear from the following detailed description of a preferred embodiment, described with respect to the accompanying drawing.

DETAILED DESCRIPTION OF A PREFERRED EMBODIMENT

Figure 2:
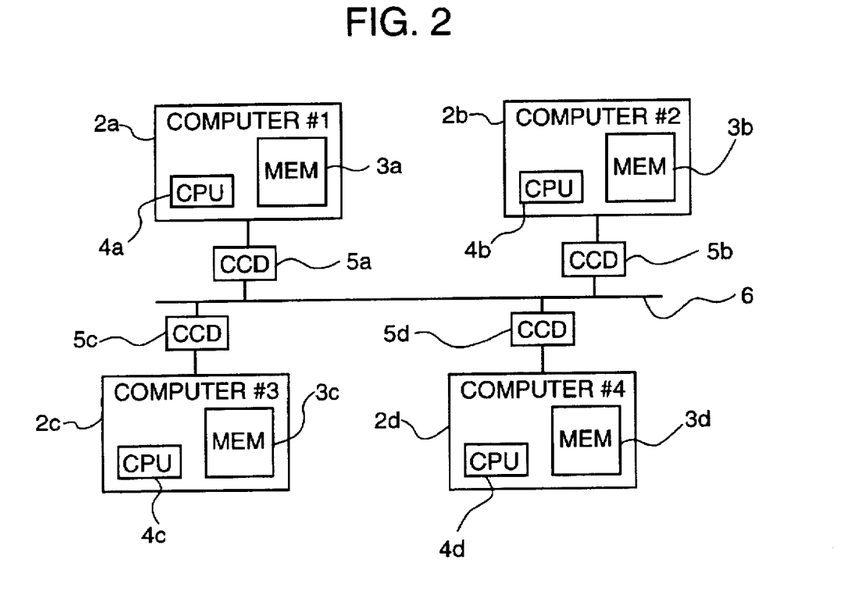
FIG. 2 is a diagram showing a distributed system.

FIG. 2 is a block diagram showing a distributed memory computer system to which the present invention is applied, Computers 2 (2a to 2d) each of which has a processor 4 (4a to 4d) and a memory 3 (3a to 3d) are connected to a transmission line 6 by standard communication control devices (CCD) 5 (5a to 5d), respectively.

Figure 3:
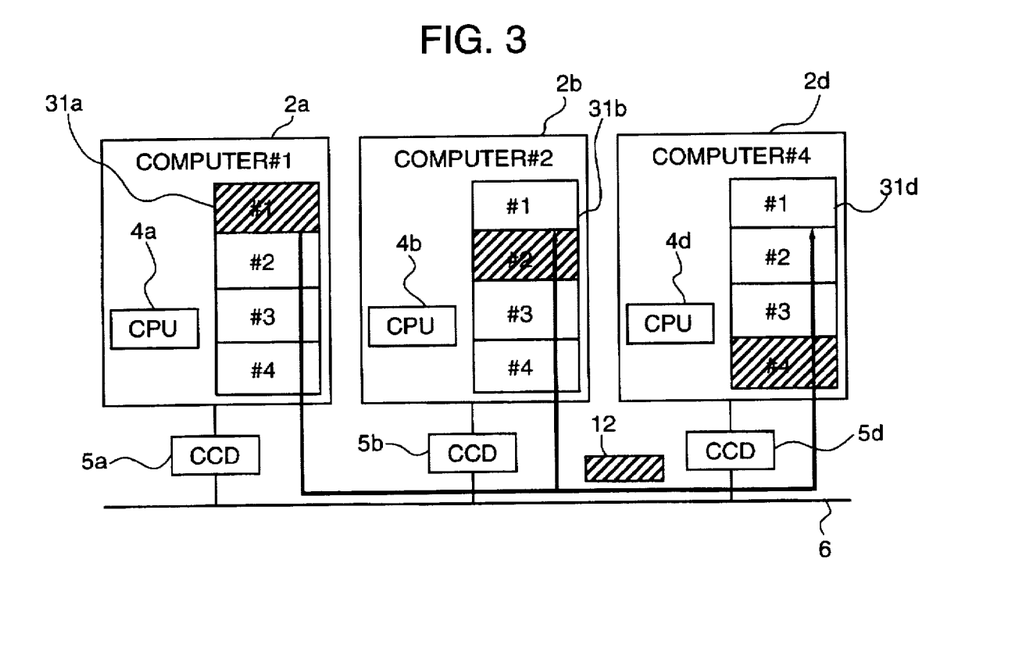
FIG. 3 is a conceptual diagram of memory copy.

FIG. 3 is a conceptual diagram for explaining the memory copy operation, which is performed among the computers 2a to 2d. A dedicated memory-copy area 31 (31a to 31d) of the memory 3 of each computer 2 includes processor memory areas corresponding to its own processor and to the other computers 2, i.e. areas #1–#4. Each of the computers 2 freely reads and writes data from and into its own processor memory area having a corresponding number, e.g. processor memory area #1 for computer #1, but only reads data from the other processor memory areas, e.g. areas #2–#4 of computer #1, corresponding to the other computers, except for updating by memory copy.

Each of the computers 2 periodically transmits the contents of its own processor memory area (indicated by hatching) to the other computers by broadcasting through the communication control device and transmission line. The hatched area is one of the processor memory areas included in the memory-copy area 31 (31a to 31d). Each of the computers 2 writes memory copy data received from the other computers into the processor memory areas corresponding to the respective transmitting other computers, thereby the contents of all the dedicated memory-copy areas coincide with one another periodically.

FIG. 3 shows one example of the manner in which the computer (#1) 2a broadcasts the contents of its own processor memory area #1 through the CCD 5a and the transmission line 6, and each of the other computers 2b to 2d writes the received data from their own CCDS 5b–5d into the processor memory area #1. Each of the computers 2b to 2d sequentially repeats a similar broadcast operation relative to processor memory areas #2 to #4, whereby the contents of all the memory-copy areas periodically coincide with one another.

Figure 1:
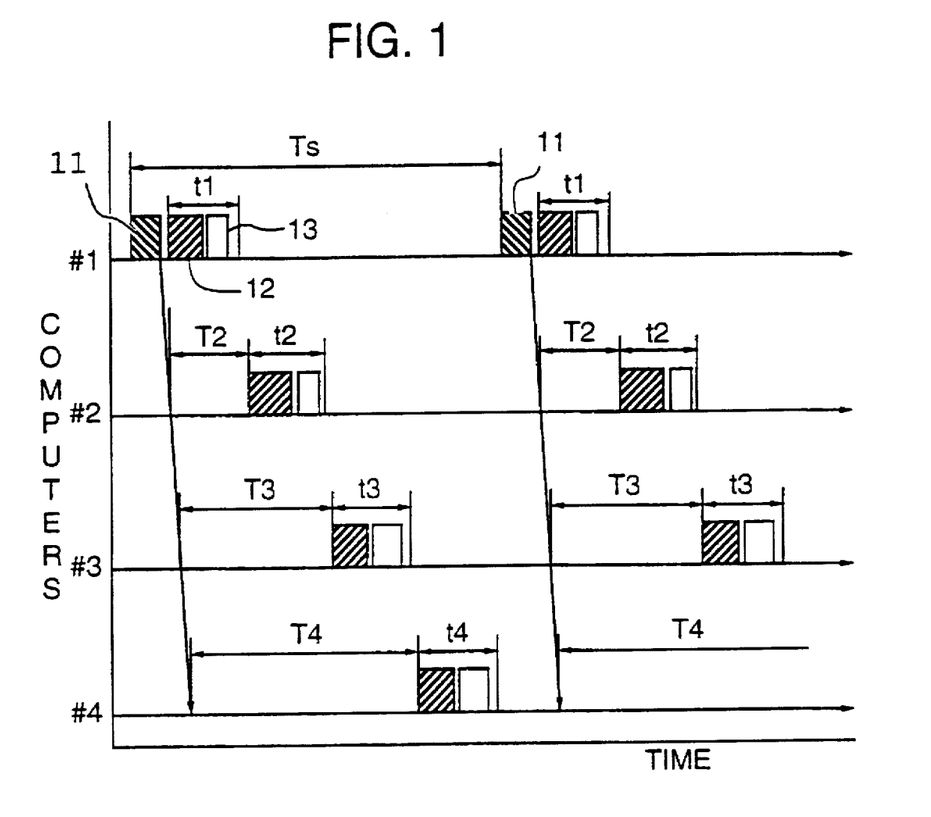
FIG. 1 is a timing chart showing data transmission control.

FIG. 1 is a timing chart showing data transfer control according to the present invention. In this example, the computer #1 (top line) functions as a master. The master computer #1 transmits synchronizing packets 11 at intervals of a period Ts, and transmits memory copy data 12 and normal data 13 to be supplied to the other computers for purposes other than memory copy, within a time slot ti immediately after the transmission of each synchronizing packet 11.

When receiving a synchronizing packet 11, the computers #2 to #4 other than the master computer #1 transmit their data 12 for memory copy and the normal data 13 after the elapse of their unique waiting times (T2 to T4), which are respectively preassigned to the computers #2 to #4. The transmission of the data 12 and 13 from each of the computers #2 to #4 is completed within a predetermined transmission enable time (time slot t2, t3 or t4) so that no contention can occur.

A waiting time Ti and a transmission enable time ti for each of the computers 2 are set to satisfy $T(i+1) > Ti+ti$ and $\Sigma ti < Ts$, providing a predetermined time margin (tm of FIG. 11 being equal to or greater than the propagation delay), between the end of a transmission from one computer and the start of a transmission from the succeeding computer. The transmission enable time (time slot) ti does not need to be set to the same value for all the computers, and a computer from which to transmit a larger amount of data (memory capacity) may be assigned a larger value ti and a larger memory area 31 than another computer. By assigning different time slots to the respective computers in advance, data transmission is performed at shifted timings in the above-described manner, to periodically memory copy while avoiding a collision between data on the transmission line.

Figure 4:
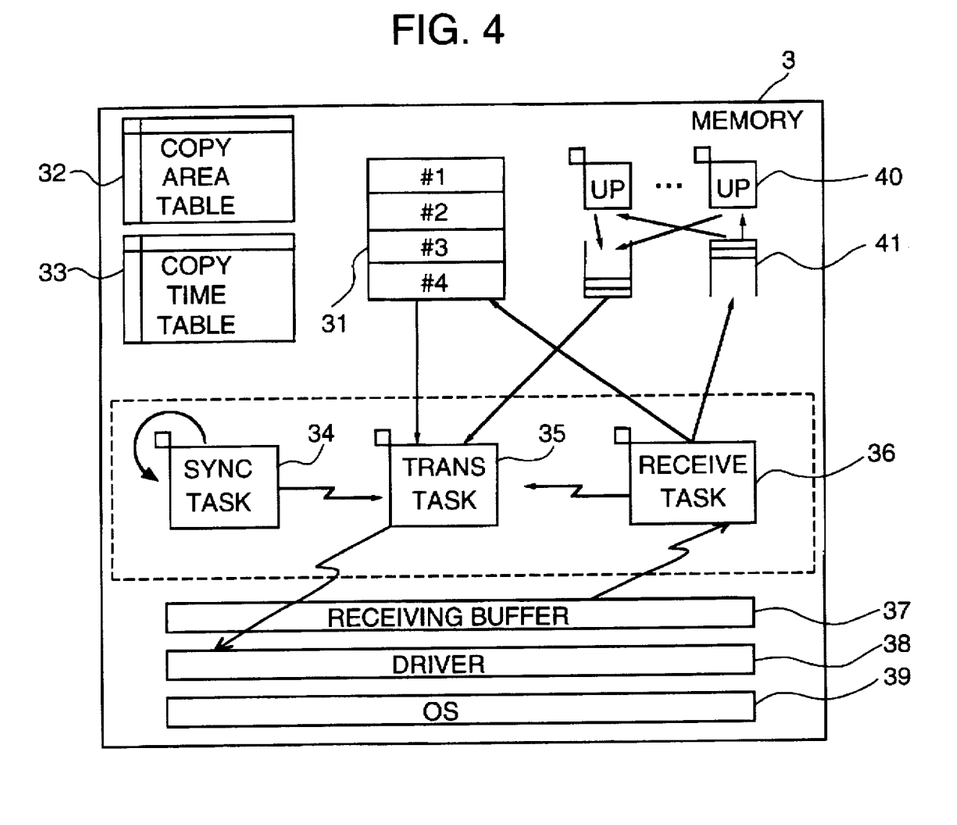
FIG. 4 shows software construction of a computer.

FIG. 4 shows in more detail the construction of the memory 3 of each of the computers 2 in FIG. 1. The memory 3 includes the dedicated memory-copy area 31 which includes areas (e.g. #1–#4) corresponding to the individual computers 2, a copy area management table 32 for managing the dedicated memory-copy area 31, a copy time management table 33 for managing a waiting time and a transmission enable time, a synchronizing packet transmission task (SYNC TASK) 34 which is periodically activated to broadcast synchronizing packets, a data transmission task (TRANS TASK) 35 which is activated by the synchronizing packet transmission task 34 and a receiving task 36 to perform the processing of transmitting memory copy data and normal data, and the receiving task (RECEIVE TASK) 36 for receiving a synchronizing packet, receiving memory copy data, writing the received data into the memory 3 and receiving normal data. A receiving buffer 37, a driver 38 for executing control of the communication control device 5, and an OS (Operating System) 39 for executing the tasks, timer management, control of an interrupt from the communication control device 5 and the like are also provided. The user programs (UP) 40 access the dedicated memory-copy area 31 or execute transmission and reception of normal data through transmission and reception queues 41.

Figure 5:
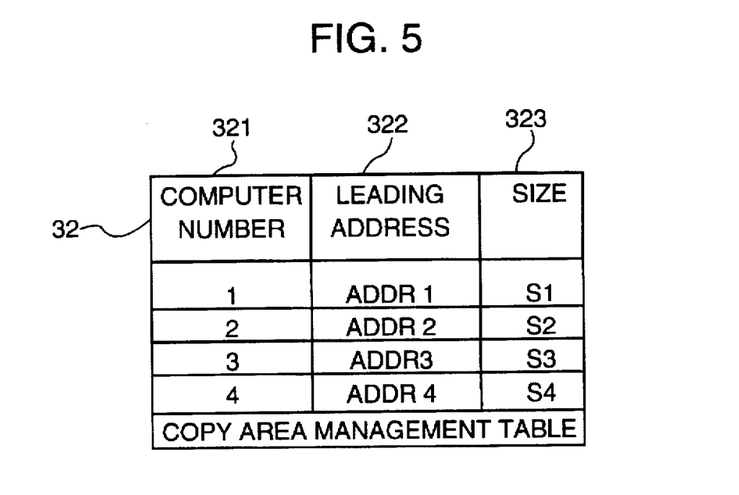
FIG. 5 shows a copy area management table.

FIG. 5 shows in more detail the copy area management table 32 of FIG. 4. An entry provided for each of the computers 2 is made up of a field 321 in which to set a computer number, a field 322 in which to set a leading address of the memory-copy area 31, and a field 323 in which to set the size of the memory-copy area 31.

Figure 6:
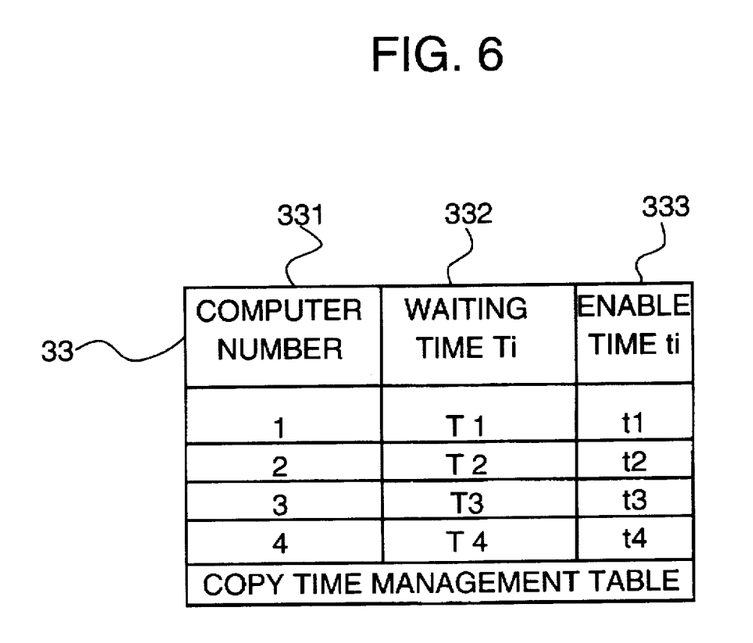
FIG. 6 shows a copy time management table.

FIG. 6 shows the construction of the copy time management table 33. Each entry is made up of a field 331 in which to set a computer number, a field 332 in which to set the waiting time Ti which elapses from the arrival of a synchronizing packet 11 until the start of the time slot for data transmission, and a field 333 in which to set the transmission enable time (time slot) ti. The copy area management table 32 and the copy time management table 33 are set in advance to have identical or different contents for each of the computers 2.

The processing of each of the tasks will be described below.

Figure 7:
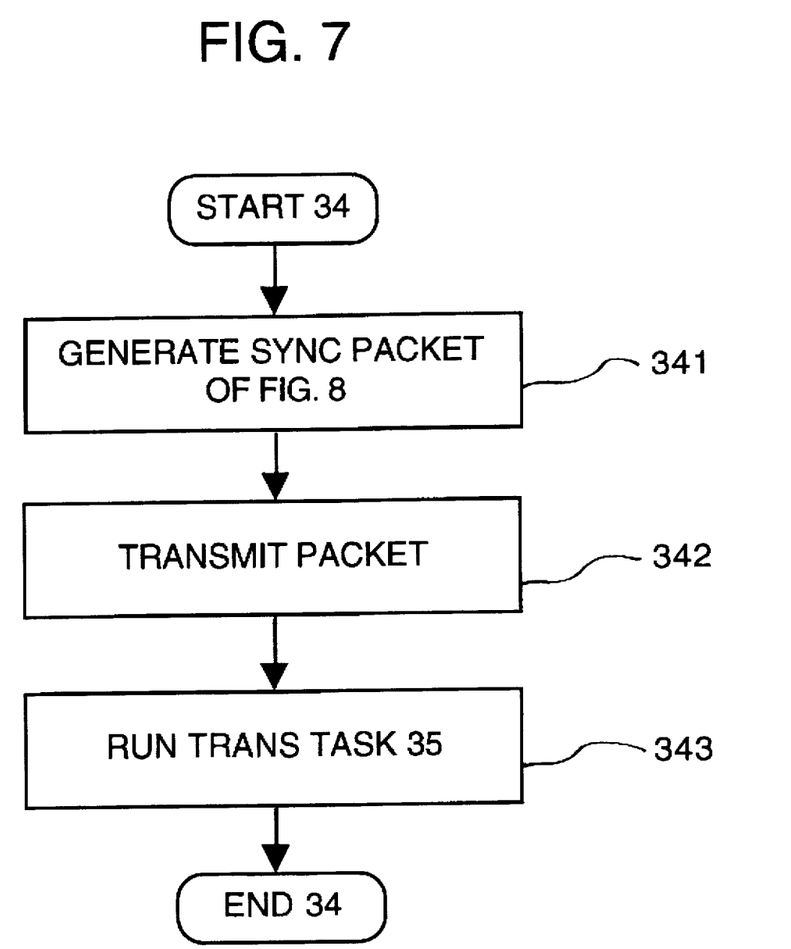
FIG. 7 is a flowchart showing a synchronizing packet transmission task.

FIG. 7 is a flowchart showing the function of the synchronizing packet transmission task 34 of FIG. 4. The synchronizing packet transmission task 34 generates a synchronizing packet having the format shown in FIG. 8 (Step 341), and transmits the synchronizing packet by activating the driver 38 (Step 342). Then, to transmit data for memory copy and normal data, the synchronizing packet transmission task 34 activates the data transmission task 35 (Step 343).

Figure 8:
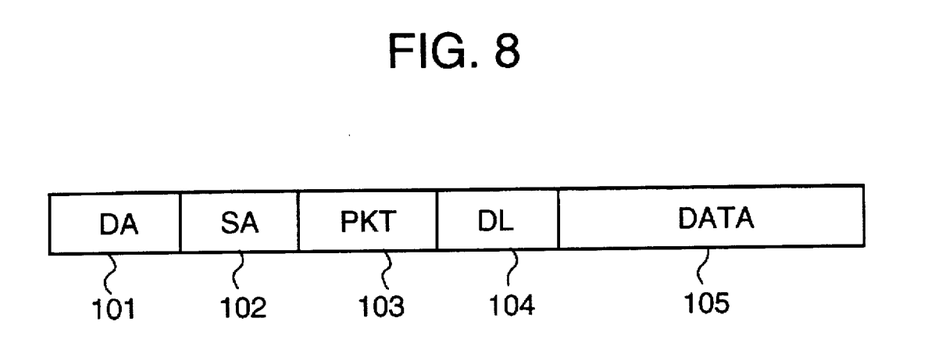
FIG. 8 shows the format of each of a synchronizing packet and a data packet.

The packet format shown in FIG. 8 is common to the synchronizing packet 11, the data packet 12 for memory copy and the normal data packet 13. The format is made up of a destination address (DA) 101, a source address (SA) 102, a packet type (PKT) 103 (which indicates that this packet is one of the synchronizing packet 11, the data packet 12 for memory copy and the normal data packet 13), a data length (DL) 104 and a data part (DATA) 105. The synchronizing packet 11 and the data packet for memory copy 12 are broadcast, and a broadcast address is set as the destination address 101. In the case of the synchronizing packet 11, the data part 105 is empty.

Figure 9:
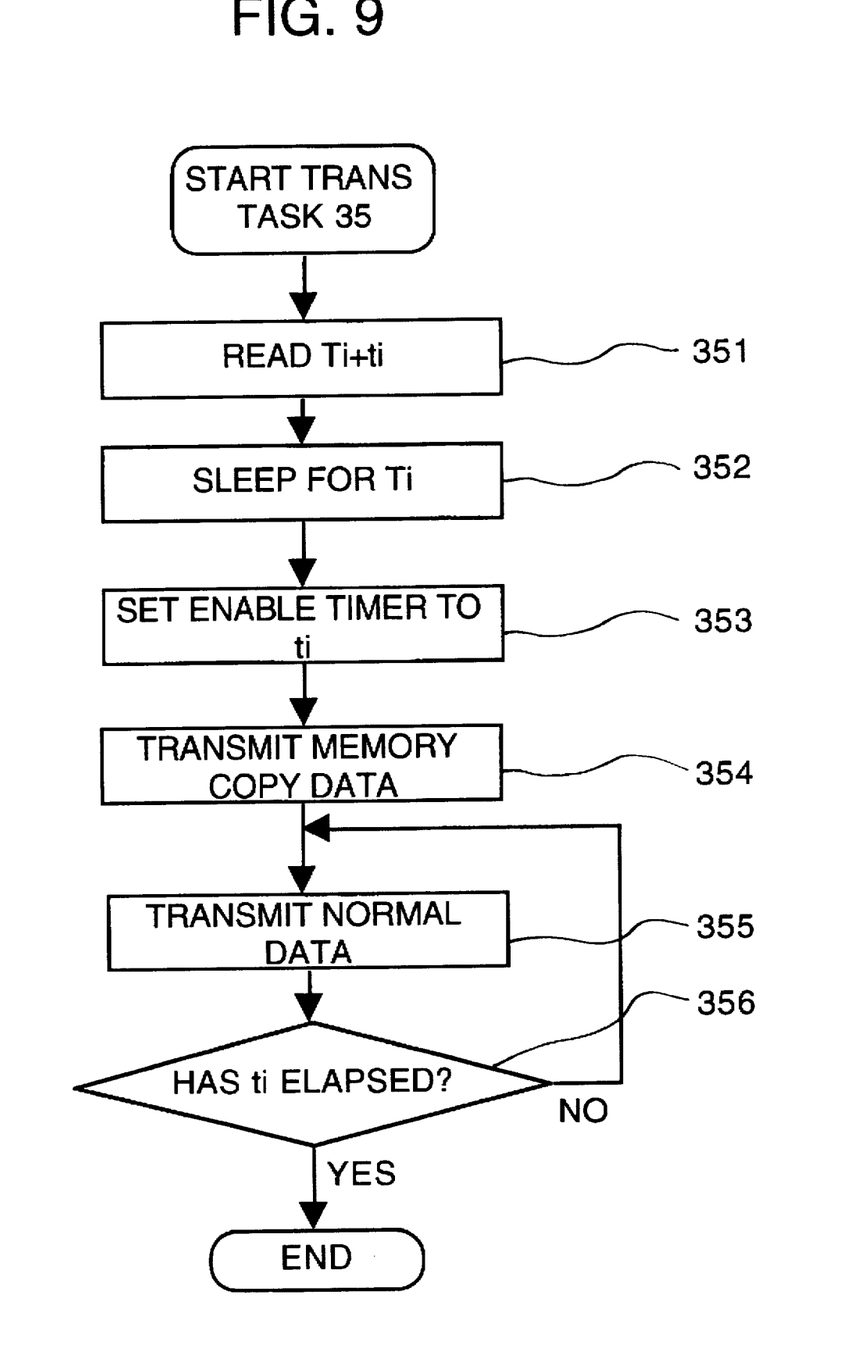
FIG. 9 is a flowchart showing the data transmission task.

FIG. 9 is a flowchart showing the data transmission task 35 of FIG. 4. The data transmission task 35 is activated by step 343 of the synchronizing packet transmission task 34 and the receiving task 36, which will be described later. When activated, the data transmission task 35 first reads the waiting time Ti and the transmission enable time ti from the field 332 and the field 333 of the entry of the copy time management table 33, shown in FIG. 6, that corresponds to the computer 2 which contains this data transmission task 35 (Step 351). The data transmission task 35 sleeps until the predetermined time Ti elapses (Step 352). In the case of the master computer #1, T1=0.

When the predetermined waiting time Ti elapses, the data transmission task 35 sets the time ti as a time-out value and activates a transmission limit (i.e. enable) timer (Step 353). Then, the data transmission task 35 transmits data for memory copy (Step 354), and transmits normal data before the end of the time slot when the transmission limit timer times out (Steps 355 to 356). If there is no normal data to be transmitted, the data transmission task 35 waits for the time-out of the transmitting limit timer without executing anything.

The synchronizing packet, the packet of data for memory copy and packet of the normal data are sequentially broadcast transmitted from the master computer #1 to the transmission line 6. These data are received by each of the computers #2 to #4 other than the master computer #1 and stored in the respective receiving buffer 37 by the driver 38. The receiving task 36 is activated by the driver 38 at the time of each data reception.

Figure 10:
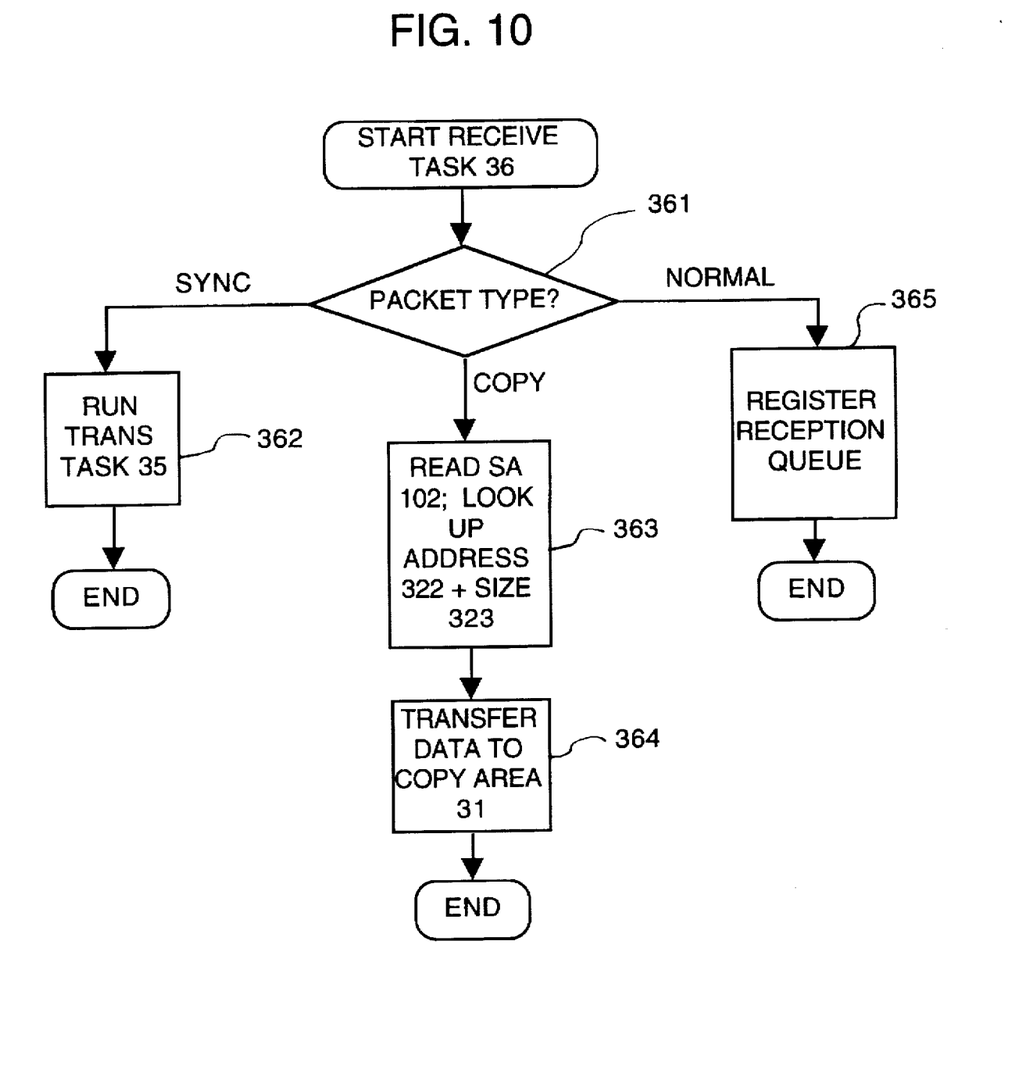
FIG. 10 is a flowchart showing the receiving task.

FIG. 10 is a flowchart of the receiving task 36. The receiving task 36 determines the type of received packet on the basis of the packet type 103 (Step 361), and if the received packet is the synchronizing packet, the data transmission task 35 is activated (Step 362). If the received packet is the data for memory copy, the receiving task 36 first reads the source address 102, accesses the entry of the copy area management table 32, shown in FIG. 5, that corresponds to the associated computer, and reads the leading address and size of an area to which the data is to be copied (Step 363). Then, the receiving task 36 transfers the data from the receiving buffer 37 to the memory-copy area 31 (Step 364). In the case of the normal data, the receiving task 36 executes the processing of registration of a reception queue (Step 365).

With the timing of FIG. 1, data are transmitted without a collision on the transmission line 6.

The above description assumes that each of the computers accurately keeps the times Ti and ti. However, in an actual system, there is a possibility that deviations occur among individual computers because of precision variations existing among counting timers, the presence of high-priority processing other than memory copy and the like, so that one time slot may overlap the succeeding time slot. Such a deviation in data transmission time duration can be avoided by providing a time margin (tm of FIG. 11, referred to as the "guard time") between the end of a transmission from each of the computers and the start of a transmission from the succeeding one. To increase the efficiency of memory copy, it is desirable to make the guard time as short as possible. However, if the guard time is made too short, it will be impossible to absorb the deviations among the time slots of the individual computers. If one of the computers continues a transmission beyond its guard time, this will influence the transmission from the succeeding computer.

However, preferably CSMA/CD is used for the transmission line, so that even if the guard time is small, zero or even negative, it will be possible to avoid collision and absorb the deviations among the time slots, by using the carrier sense function of CSMA/CD.

Figure 11:
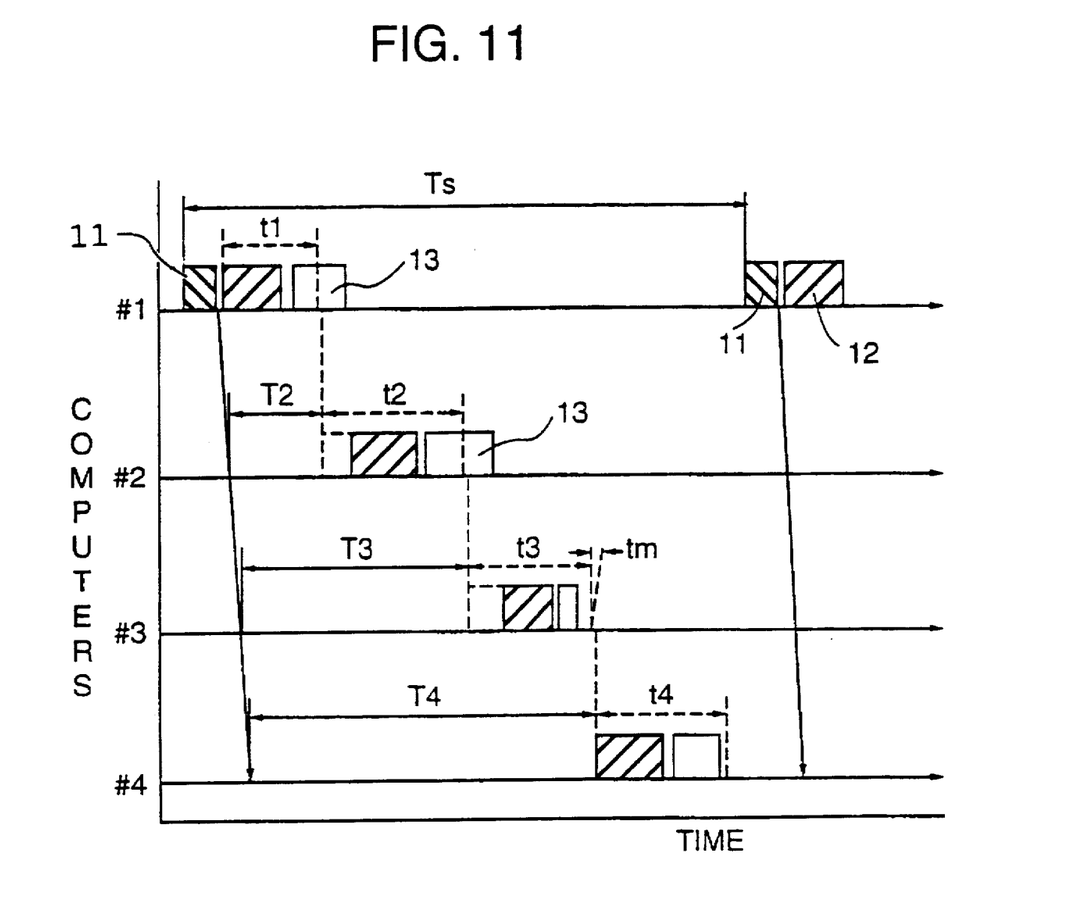
FIG. 11 is a timing chart showing the advantage of CSMA/CD.

The timing chart of FIG. 11 shows the case in which the computer #1 continues a transmission beyond its data transmission enable time (time slot) $t_1$ and the transmission from the computer #1 has not been completed at the time of the start of a transmission from the computer #2. In such a case, the communication control device 5b for the computer #2, which enters its own time slot $t_2$, is about to transmit data, detects the transmission line being busy, and then temporarily buffers data for memory copy received from the computer #2, on the basis of a transmission procedure conforming to CSMA/CD. After an appropriate time has elapsed, the standard communication control device 5b retries a transmission. Owing to the above-described function, the data buffered from the computer #2 into the communication control device 5b is transmitted to the transmission line 6 at the timing that the transmission of the data from the preceding computer #1 has been completed and the transmission line 6 is released from the busy state.

If the transmission of the data from the computer #2 has not been completed at the time of start of a transmission from the computer #3, the corresponding communication control device 5c buffers data to be transmitted, by the above-described transmission function according to CSMA/CD. If the data transmitted from the computer #3 is of short length, the data transmission started late by the computer #3 will be completed within the time slot t3. Accordingly, at the time of start of a transmission from the succeeding computer #4, the communication control device 5d of computer #4 confirms that the transmission line is idle and transmits data to the transmission line.

In this manner, the deviations of transmission start timings occurring in the respective computers #2 and #3 are absorbed so that transmission of the succeeding synchronizing packets is at intervals of the predetermined periods Ts. In the data transmission control according to the present invention, only two computers may cause concurrent transmission since the time slots are allotted to the respective computers in advance. Accordingly, even if a previous computer continues a data transmission beyond its time slot or Tm is negative, the succeeding computer has the next opportunity to securely transmit data, thereby enabling a periodical data transmission.

Figure 12:
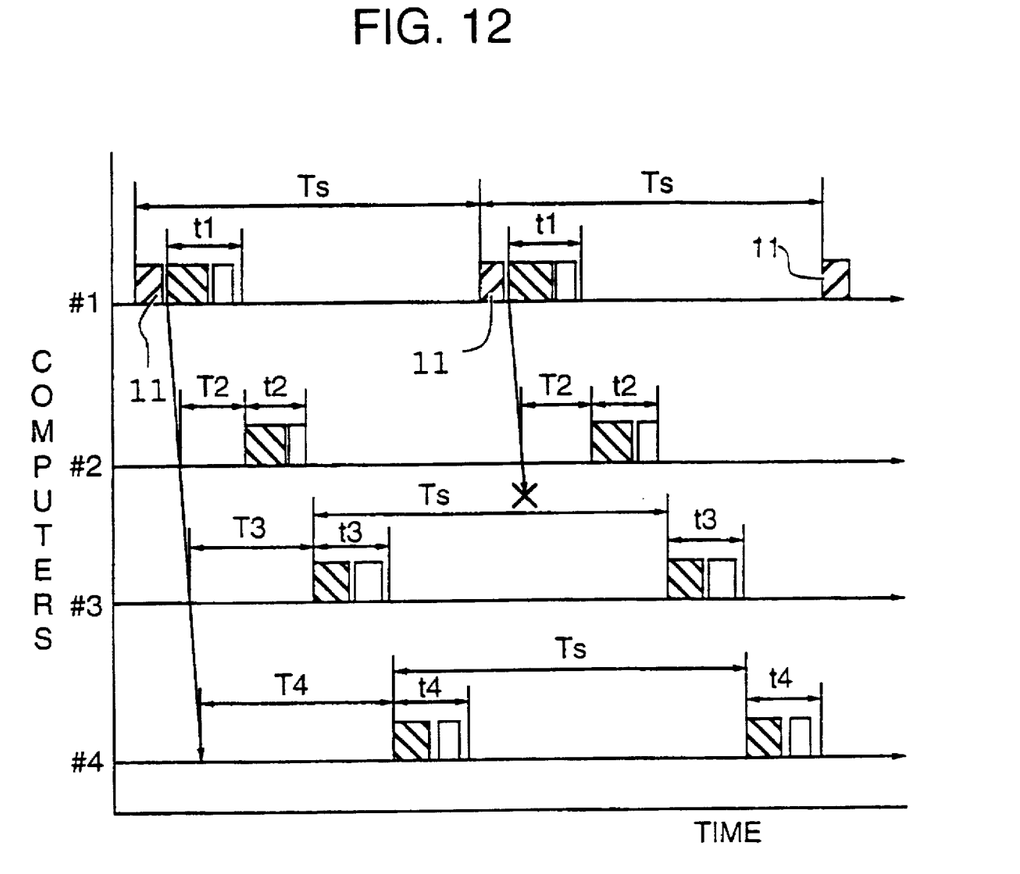
FIG. 12 is a timing chart showing further details.

FIG. 12 is a timing chart showing further details of the present invention with respect to time slots following those described above. With the transmission of data for memory copy from each computer at least initially depending on synchronizing packets as described above, the memory copy function will be interrupted, for example, if a master computer goes down or a subsequent synchronizing packet disappears on the transmission line 6. Therefore, each computer also measures the timing of its succeeding time slot on the basis of the end of its preceding time slot, by time management using a transmission period Ts timer. Accordingly, even if a synchronizing packet is not transmitted or lost in the transmission line 6, a next memory copy is activated by the transmission period Ts timer. In FIG. 12, as long as the synchronizing packet 11 is correctly transmitted from the master computer #1 at intervals of the period Ts and periodically arrives at the other computers #2–#4, a data transmission operation is performed in a procedure repeating that of FIG. 1. If no synchronizing packet arrives at computer #3, e.g., the computer #3 performs data transmission at repeated intervals of the period Ts by self-activation. A subsequently received synchronizing packet 11 will retime the transmission period Ts timer (initialize it) to be in proper phase offset with respect to the master computer #1. The transmitting and receiving of the synchronizing packet and the receiving of data are respectively performed in accordance with the synchronizing packet transmission task 34 shown in FIG. 7 and the receiving task 36 shown in FIG. 10.

Figure 13:
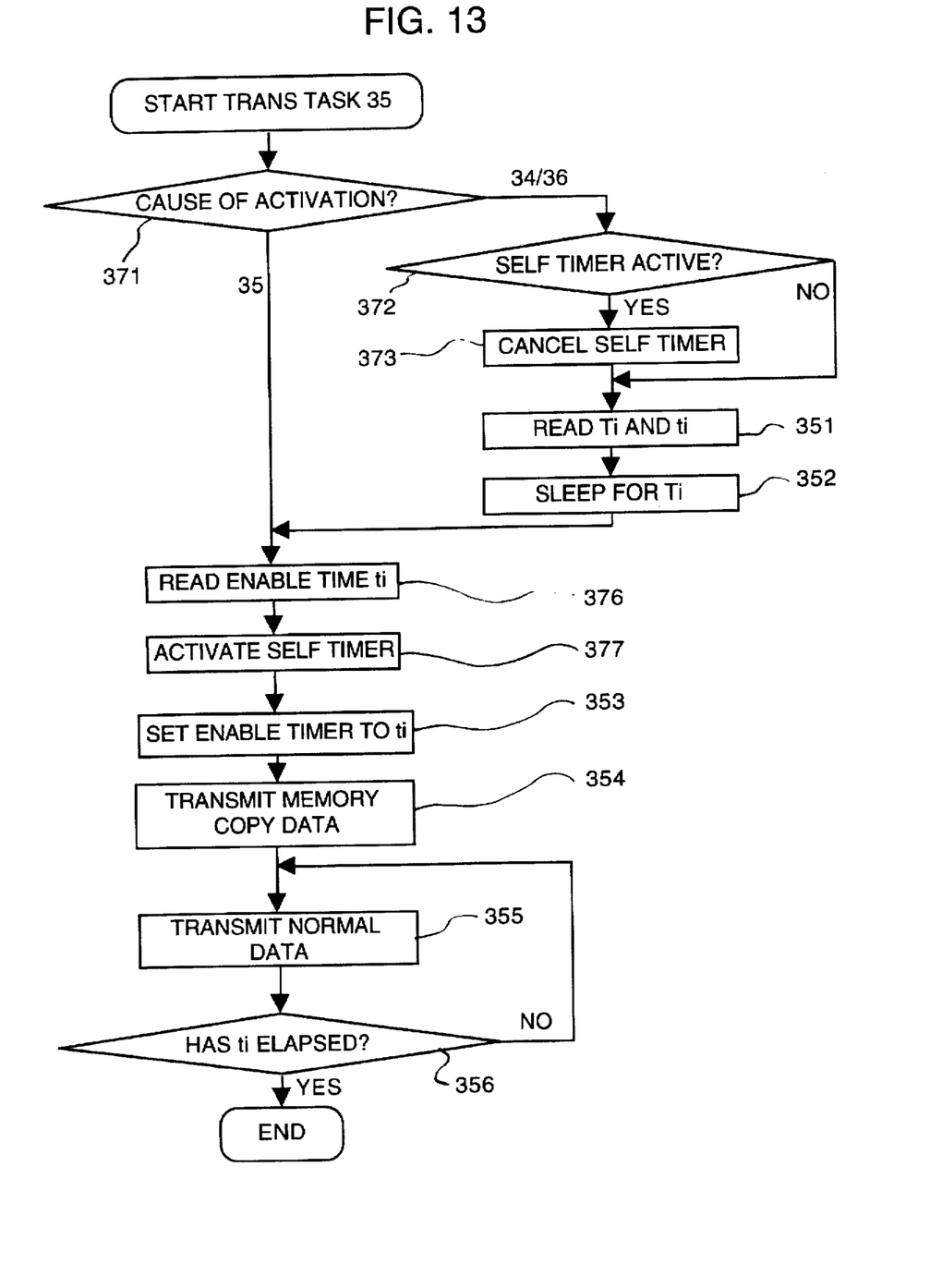
FIG. 13 is a flowchart showing the receiving task accord/ to timing of FIG. 12.

FIG. 13 shows the data transmission task 35 in greater detail than in FIG. 9, to include the details explained with respect to FIG. 12. When the data transmission task is activated, the cause of the activation is determined (Step 371). If the activation is caused by the receiving task 36 or the synchronizing packet transmission task 34, it is determined whether a self-timer is active (Step 372). If the self-timer is active, the self-timer is canceled (Step 373) and the waiting time Ti and enable time ti are read (Step 374). The data transmission task sleeps during the waiting time Ti (Step 352).

At the time when the waiting time Ti elapses, the data transmission task reads the transmission enable time ti (Step 376) (thus step 351 of FIG. 9 is, in more detail, steps 374 and 376), and activates the self-timer for the purpose of the next transmission (Step 377). Subsequently, transmitting data is executed in Steps 353 to 356 of the data transmission task already shown in FIG. 9. If the cause of the activation is the time-out of the self-timer, this indicates that no synchronizing packet has arrived. Accordingly, the data transmission task reads the transmission enable time ti (Step 376), activates the self-timer (Step 377), and performs the processing of transmitting data (Steps 353 to 356).

Figure 14:
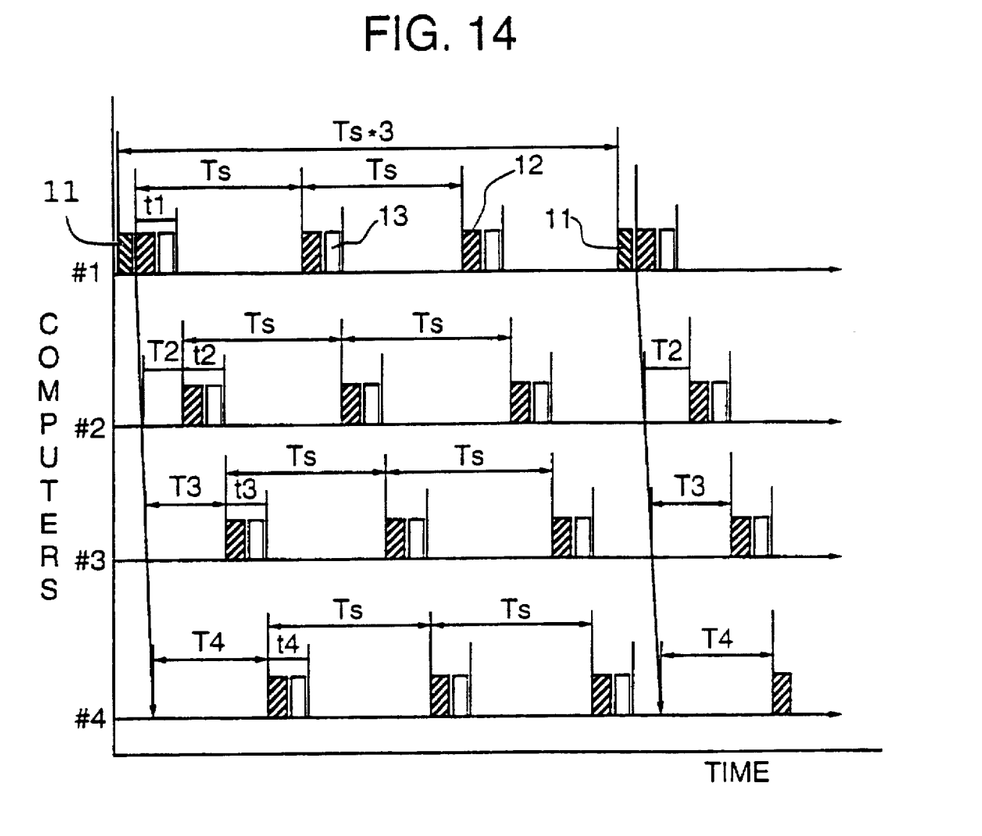
FIG. 14 is a timing chart showing further details.

FIG. 14 shows a timing chart with further details. The difference between FIG. 14 and FIG. 12 is that the master computer #1 in FIG. 14 intermittently transmits synchronizing packets 11 at the rate of one synchronizing packet to n transmissions of data packets 12, 13. The master computer #1 transmits synchronizing packets 11 at intervals of the period T=Ts*n, and the other computers #2–#4 establish synchronism with one another on the basis of the synchronizing packet 11. When each of the computers receives the synchronizing packet 11, the computer confirms that the transmission line 6 is idle when the waiting time Ti peculiar to the computer elapses, and then the computer executes data transmission. At the subsequent n-1 opportunities of data transmissions, each of the computers periodically activates its own transmission task 35 by the self-timer, thereby performing the data transmissions at intervals of a copy period Ts.

As is apparent from the foregoing description, in accordance with the present invention, since each computer is assured the opportunity to transmit normal data and data for memory copy, the memory contents shared among individual computers can be periodically updated, so that latest data about other computers can be read out in a manner similar to that in which its own data is read out. Further, since there is no need to provide a special memory copy function in each communication control device 5 and memory copy is preferably performed through a transmission line 6 according to CSMA/CD, the present invention is effective in forming an open network.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. A memory copy data transmission control method for use in a distributed memory computer system in which a plurality of computers, each having a processor and a memory, are connected to a transmission line via respective communication control devices, comprising the following steps:

each computer intermittently broadcasting memory copy data to all others of the computers so that memory data contents of all of the computers will coincide with one another by memory copy;

broadcasting a synchronizing packet at intervals from one of the computers serving as a master computer, wherein each computer other than the master computer has a pre-assigned time slot, identified by said each computer by using a timer thereof, beginning when a pre-assigned time has elapsed after receiving the synchronizing packet, in which to respectively perform said broadcasting in said pre-assigned time slot;

starting to repeat said step broadcasting memory copy data by a timer activation when no succeeding synchronizing packet arrives within a predetermined time after a preceding time slot; and resetting the timer with a subsequently received synchronizing packet.

2. A data transmission control method according to claim 1, wherein said step broadcasting a synchronizing packet is performed so that the synchronizing packet is broadcast at the rate of one synchronizing packet to a plurality of said broadcasting memory copy data for each computer.

* * * * *